Patented Dec. 22, 1925.

1,566,271

UNITED STATES PATENT OFFICE.

VINCENZO CESA, OF HOBOKEN, NEW JERSEY.

MEDICINAL PREPARATION.

No Drawing.    Application filed April 8, 1921.  Serial No. 459,720.

*To all whom it may concern:*

Be it known that I, VINCENZO CESA, a subject of the King of Italy, and a resident of Hoboken, county of Hudson, and State of New Jersey, have invented certain new and useful Improvements in Medicinal Preparations, of which the following is a specification.

This invention relates to improvements in medicinal preparations.

One of the objects of my invention is to produce a medicinal preparation having skin-healing characteristics of high degree and adapted to cure certain forms of skin diseases, such as eczema, acne, pimples and like skin ailments.

Another object of my invention is to produce a medicinal preparation or composition which may be formed of inexpensive ingredients and may be compounded by an extremely simple operation and cannot under any circumstances injuriously affect the skin of the user but on the contrary will heal the diseased condition and be beneficial to any healthy skin adjacent to the diseased parts.

Another object of my invention is to enable the healing or curing of skin diseases in a minimum amount of time.

The preferred form of my medicinal preparation consists of a composition of albumin or albuminous substances, preferably comprising the white of an egg which has been beaten into a frothy state of the consistency of whipped cream; a semi-solid fat, preferably comprising lard of a pure variety such as leaf-lard; and flour of sulphur in powdered form.

In preparing this composition, I prefer to use the ingredients in about the following proportions, viz, with the white of one egg of average size which is beaten up as above stated I use three-quarters of an ounce of lard and one-half ounce of flour of sulphur. These ingredients are thoroughly mixed and beaten up so as to form a paste or salve. When so beaten up, drops of liquid form at the top which are preferably permitted to again be absorbed or soak into the composition.

The ingredients so mixed are applied in the usual way and rubbed over the affected parts of the skin of the patient and a layer of the composition is preferably permitted to remain on the affected parts of the skin over night or for a considerable period of time.

I have found that a composition so prepared is very effective as aforesaid in quickly curing, clearing up and healing skin diseases such as eczema, acne and the like, and I have found that the average length of time for healing such affected parts is five or six days.

It will also be seen that my improved preparation is composed of inexpensive ingredients and may be compounded by an extremely simple operation and cannot under any circumstances injuriously affect the skin of the user but on the contrary will heal the diseased condition and be beneficial to any healthy skin adjacent to the diseased parts.

Having described my invention I claim:—

1. A medicinal preparation composed of an albumin comprising the white of an egg in a frothy state, a semi-solid fat and sulphur.

2. A medicinal preparation composed of the white of an egg in a frothy state of the consistency of whipped cream, lard and flour of sulphur, said ingredients being used in the following proportions—white of one egg; three-quarters of an ounce of lard and one-half ounce of flour of sulphur.

In witness whereof, I have signed my name to the foregoing specification.

VINCENZO CESA.